(12) United States Patent
Bobler et al.

(10) Patent No.: US 6,176,516 B1
(45) Date of Patent: Jan. 23, 2001

(54) AIRBAG MODULE WITH A HORN SWITCH FOIL

(75) Inventors: Hans-Jürgen Bobler, Münster; Stefan Gehlert, Ruppertshütten; Anke Nigrin, Lohr; Willi Wissel, Mömbris, all of (DE)

(73) Assignee: TRW Automotive Safety Systems GmbH & Co. KG, Aschaffenburg (DE)

( * ) Notice: Under 35 U.S.C. 154(b), the term of this patent shall be extended for 0 days.

(21) Appl. No.: 09/359,007

(22) Filed: Jul. 22, 1999

(30) Foreign Application Priority Data

Jul. 24, 1998 (DE) .......................................... 298 13 240 U

(51) Int. Cl.⁷ .................................................. B60R 21/16
(52) U.S. Cl. ........................................ 280/731; 200/61.54
(58) Field of Search ............................. 280/728.1, 728.2, 280/728.3, 731; 200/61.54, 61.55

(56) References Cited

U.S. PATENT DOCUMENTS

| | | | |
|---|---|---|---|
| 5,338,059 | 8/1994 | Inoue et al. | 280/728.3 |
| 5,371,333 | 12/1994 | Kanai et al. | 200/61.54 |
| 5,577,766 | 11/1996 | Niwa et al. | 280/731 |
| 5,630,617 | 5/1997 | Hashiba | 280/731 |
| 5,639,114 | 6/1997 | Margetak et al. | 280/728.3 |
| 5,642,901 | 7/1997 | Bowman et al. | 280/728.3 |
| 5,647,610 | 7/1997 | Nagata | 280/731 |
| 5,775,728 | 7/1998 | Niwa et al. | 280/728.3 |
| 5,971,430 | 10/1999 | Niwa et al. | 280/731 |
| 6,053,526 | 4/2000 | Preisler et al. | 280/728.2 |
| 6,079,734 | 6/2000 | Porter | 280/728.3 |

*Primary Examiner*—Paul N. Dickson
*Assistant Examiner*—Faye M. Fleming
(74) *Attorney, Agent, or Firm*—Tarolli, Sundheim, Covell, Tummino & Szabo L.L.P.

(57) ABSTRACT

An airbag module for a vehicle steering wheel comprises a gas generator (1) with an igniter, a folded gas bag (2), an assembly plate (3), a housing (4) with an intermediate cover (5), an outer cover cap (6) optically and haptically adapted to the steering wheel environment, and a horn switch foil (7) to be actuated by pressure exerted on the cover cap (6). A planar actuating element (8) is provided between the horn switch foil (7) and the cover cap (6) and has a consistently defined spacing from the horn foil (7). Range spacers (9) in the form of pins, webs or similar are provided between the actuating element (8) and the cover cap (6) to provide an approximately constant separation distance between the actuating element (8) and the cover cap (6), at least across the entire actuating area of the cover cap.

14 Claims, 3 Drawing Sheets

AIRBAG MODULE WITH A HORN SWITCH FOIL

The present invention relates to an airbag module for a motor vehicle steering wheel, comprising a gas generator having an igniter, a folded gas bag, an assembly plate, a housing with an intermediate cover, an outer cover cap optically and haptically adapted to the steering wheel environment, and a horn switch foil to be actuated by pressure on the cover cap.

BACKGROUND OF THE INVENTION

With such airbag modules, considerable difficulties are regularly encountered when it comes to maintaining specified separating distances which must be overcome in order to activate the horn, because this involves a plurality of components made of a variety of materials, and because tolerances with respect to the specified real production dimensions, which may be acceptable in each individual case, may add up one to another.

If the separating distances within the actuating area of the cover cap are too large in a single place only, the horn cannot be activated by the-application of the usual pressure, so that the driver must make a second attempt whilst using a greater application pressure. This leads to the horn signal being delayed, thereby causing or increasing the danger to the traffic.

If the separating distances are too small, the horn signal may be activated unintentionally or by the vibrations of the vehicle, causing irritation to the driver and to other road users.

Although a plurality of measures have already been proposed to set a specified actuation stroke for the activation of the horn signal with only small tolerances to the nominal value, these are in most cases too cost-intensive, and not sufficiently reliable in operation when taking into account influences of temperature and material fatigue over the normal lifetime of a vehicle.

An object of the invention is, therefore, to ensure that for an airbag module of the previously mentioned type tightly tolerated separating distances for the activation of the horn can be achieved without encountering the previously mentioned disadvantages. In particular it must be guaranteed that, taking into consideration the required elastic resetting forces for the actuation device, a habitual and accustomed activating range can be maintained under all possible external conditions, so that no additional danger to the traffic is created by deviations from these values.

This object is met, according to the invention, in that a flat actuating element is provided between the horn foil and the cover cap, which has a consistently defined spacing from the horn foil, which essentially extends in a plane, and in that range spacers in the form of pins, webs or similar are provided between the actuating element and the cover cap, to provide an approximately constant separation distance between the actuating element and the cover cap, at least across the entire actuating area.

The interposed flat actuating element provides the advantage that the horn foil, as recommended, can be arranged in a plane and that the internal shape of the cover cap need not be taken into consideration. On the other hand, the cover cap may be given the shape that best meets its general requirements without having to adapt it to the arrangement of the horn foil. In other words, the requirements concerning the arrangement and the shaping of both the horn foil and the cover cap can be made independent from each other by means of the interposed actuating element according to the invention. Furthermore, in the design of the actuating element there is no restriction as to the choice of the type of material, and equal separating distances can be achieved by simple means over the entire actuating area.

BRIEF DESCRIPTION OF DRAWINGS

Practical embodiments of the inventive concept as well as their advantages result from the sub-claims 2 to 14. Further particulars will be explained in more detail with reference to the exemplary embodiment shown in FIGS. 1 to 3, where

DETAILED DESCRIPTION OF THE INVENTION

Figure 1:
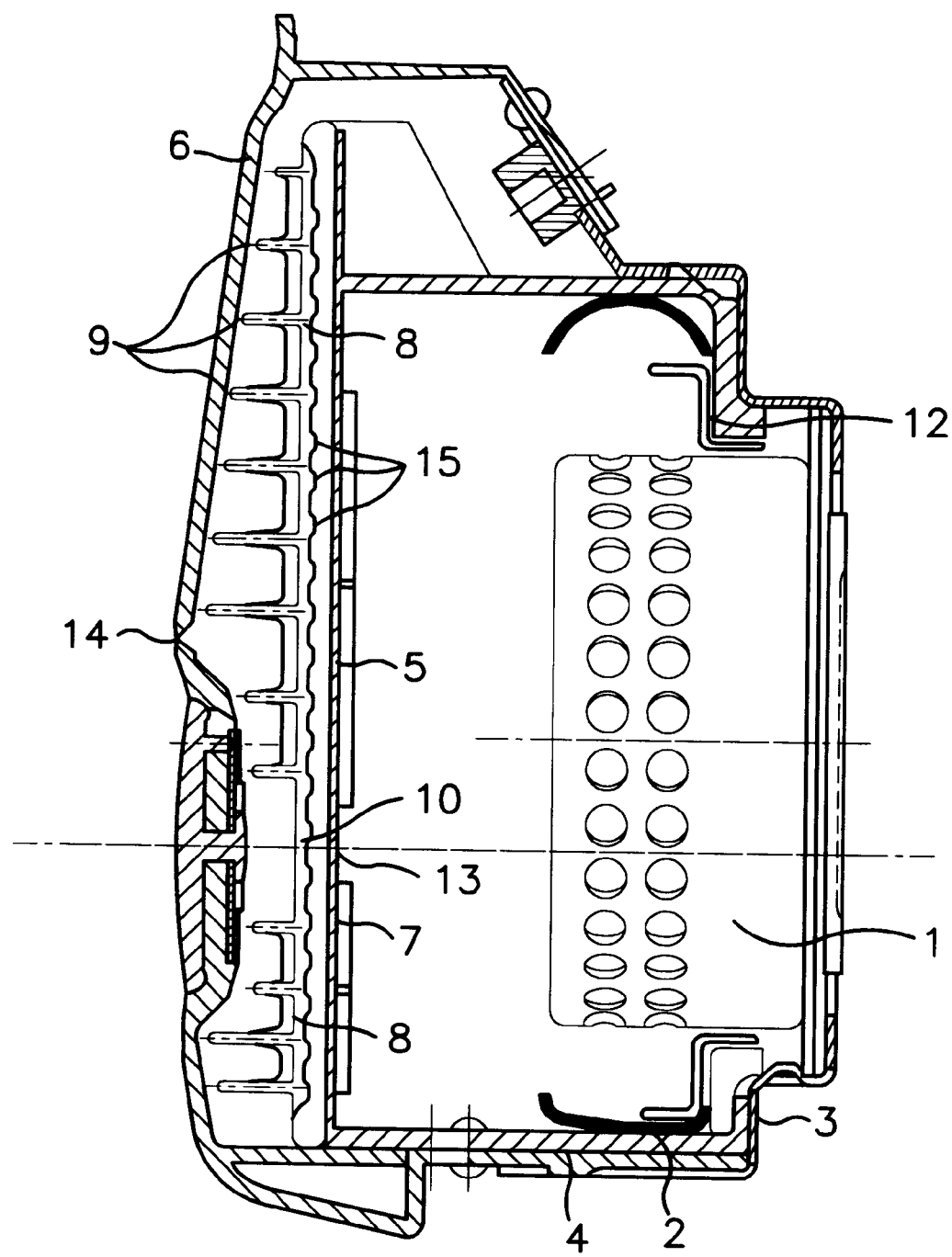
FIG. 1 illustrates an exemplary embodiment of the invention in section.

The airbag module for a motor vehicle steering wheel according to FIG. 1 comprises a gas generator 1 with igniter, a folded gas bag 2, only shown as a partial sketch, an assembly plate 3, a housing 4 and an outer cover cap 6 with optical and haptic adaptation to the steering wheel environment.

The housing 4 and the cover cap 6 are connected in the conventional manner to the assembly plate 3, which in its turn is connected to the skeleton structure of the steering wheel. The housing 4 consists of a cup shaped main part, which houses the folded gas bag 2, and that has an intermediate cover 5 towards the top part, which rests on the folded gas bag when in the assembled state. This intermediate cover 5 carries a horn foil 7, which may be activated to enable the horn to sound by pressure exerted on the cover cap 6 in the usual manner. A flat actuating element 8 is provided between the cover cap 6 and the horn foil 7, being arranged at a defined all over the place consistent distance to the horn foil 7, and which provided with range spacers in the form of pins or webs. In this way, and in accordance with the invention, similar actuating distance all over the place is created between the cover cap 6 and the horn foil 7.

An opening 12 to house the gas generator 1 is provided, on the side of the housing 4 opposed to the intermediate cover.

Figure 3:
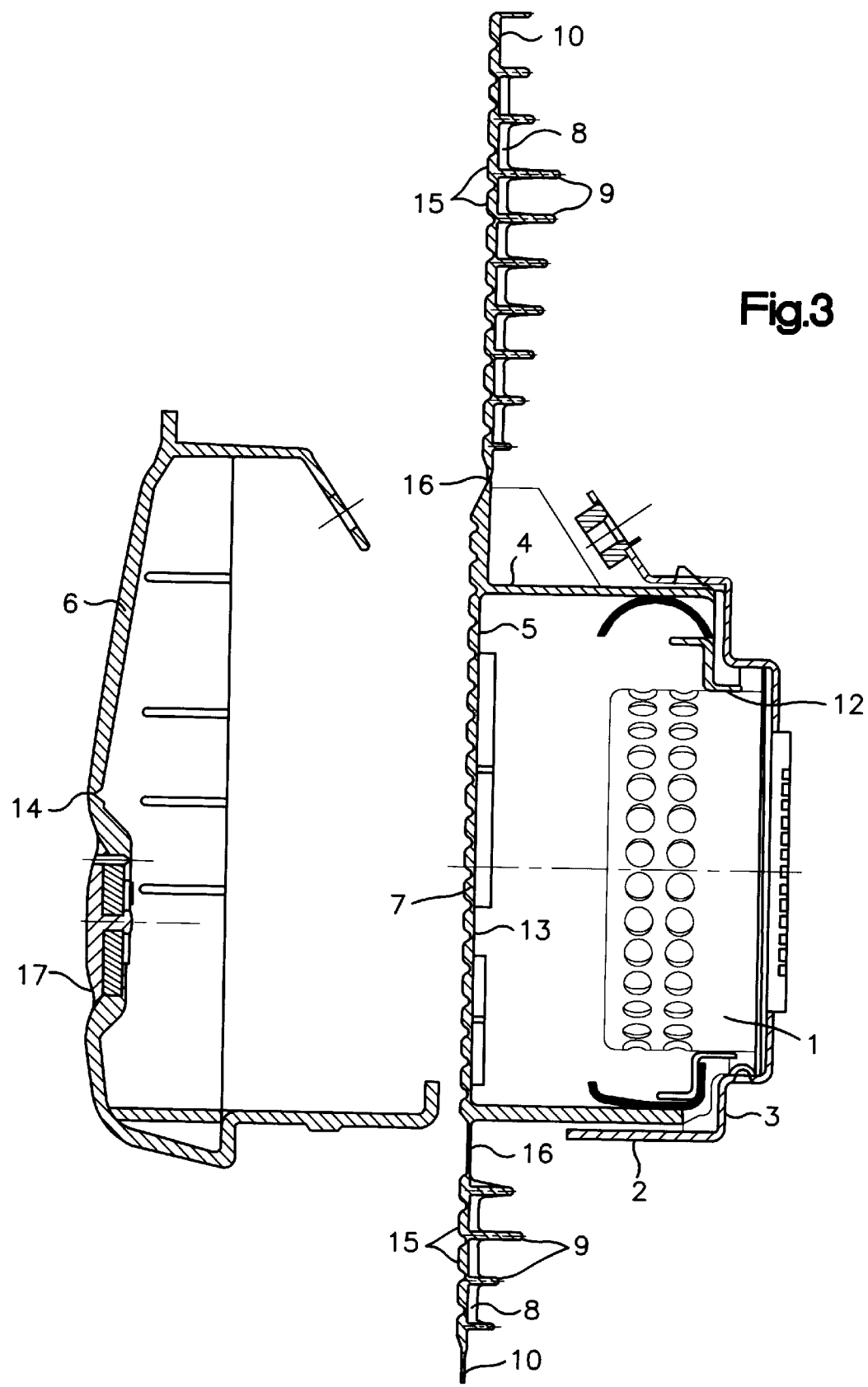
FIG. 3 is a sectional view of the exemplary embodiment according to FIG. 1, with separately represented components.

In the case of the exemplary embodiment shown, the actuating element 8 is made of plastic in one piece to incorporate the range spacers 9 and the intermediate cover, where the flat areas 8' and 8" of the actuating element 8 are folded into their functional position, as illustrated, by folding them by 180° from their original manufactured form according to FIG. 3. The rims 10', 10" of the flat sections 8', 8", after being folded over, will be above the predetermined breaking line 13 provided in the intermediate cover 5, and are connected to each other. A predetermined breaking line 14 is also provided in the cover cap 6. The surface of the actuating element. 8 facing the horn foil 7 is advisably provided with actuating knubs 15 spaced equidistantly from each other.

Figure 2:
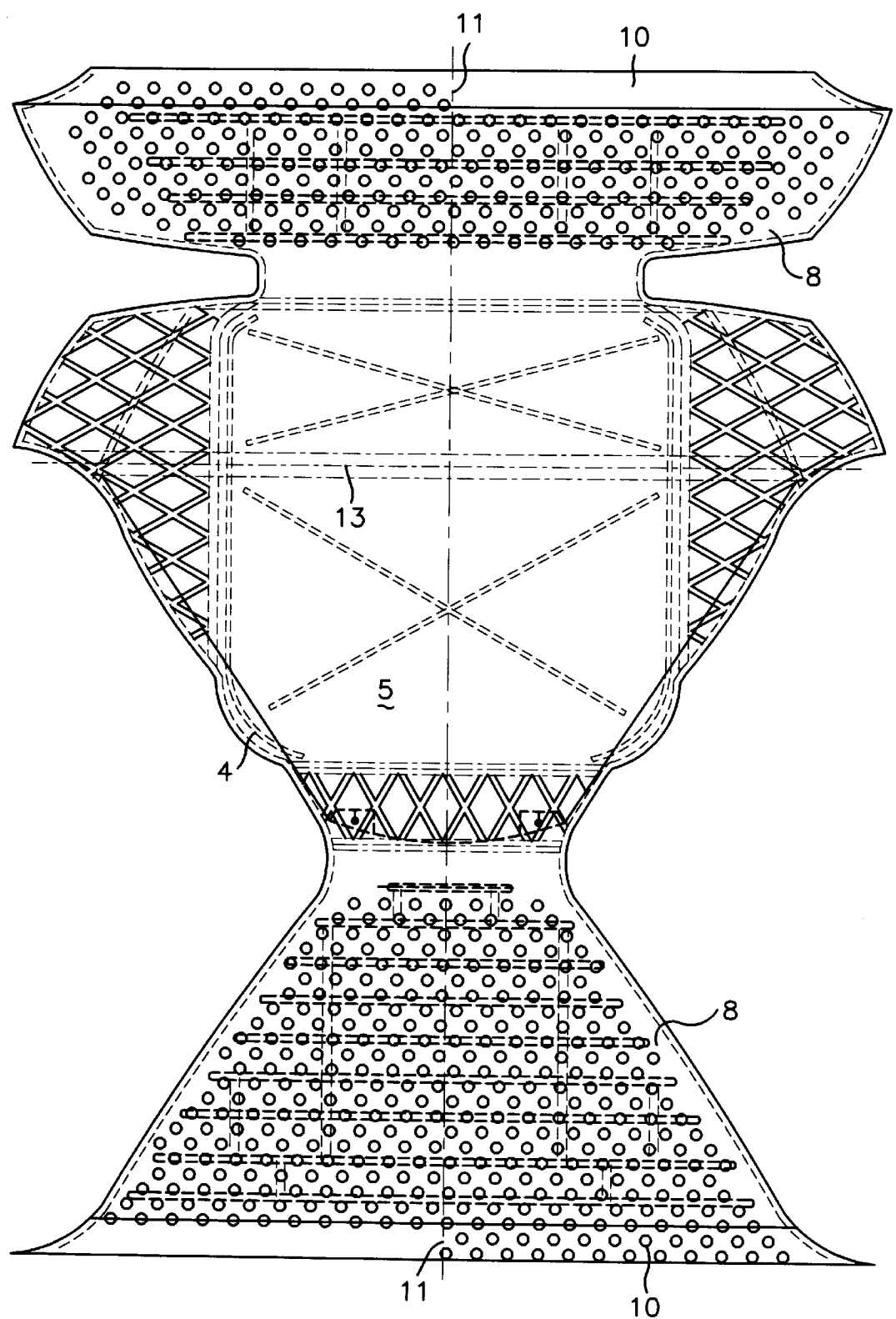
FIG. 2 is a view of the housing for the airbag module with turned-out sections of the actuating element.

FIG. 2 illustrates a view of the plastic one-piece component, which comprises the housing 4, the intermediate cover 5 and the areas 8', 8" of the actuating element 8 which can be folded inwards. A predetermined breaking line 13 running across the width of the housing is provided in the intermediate cover 5. The rims 10', 10" are provided with slots 11', 11" so that they can be plugged into each other, whereby the rims 10', 10" are arranged to be overlapping in an alternating pattern from the middle to both sides.

FIG. 3 illustrates the exemplary embodiment according to FIG. 1, sub-divided into two assemblies. The first assembly comprises the cover cap 6 with the predetermined breaking line 14 and the integrated vehicle emblem 17. The cover cap 6 is made of plastic and is provided in a manner known per se with webs or similar at the rim, with which it can be connected to the second assembly.

The second assembly comprises the gas generator 1, the gas bag 2, the assembly plate 3 and the housing 4 with the opening 12 for mounting the gas generator 1. The housing 4 is, as already described, made of plastic, produced in one piece to incorporate the intermediate cover 5, as well as the sections 8', 8" of the actuating element 8. The predetermined breaking line 13 already mentioned is provided in the intermediate cover. During production, the sections 8', 8" are made in one piece and in a plane with the intermediate cover 5, and later folded over along the folding lines 16 by 180° so that the actuating knubs 15 of the horn foil 7 and the range spacers 9, integrated in one single piece, are positioned in opposition to the cover cap 6, as can be seen in FIG. 1.

In this way an airbag module is created which meets all the previously mentioned requirements and that can be produced in a simple manner from only a few individual components.

What is claimed is:

1. An airbag module for a vehicle steering wheel, comprising a gas generator having an igniter, a folded gas bag, an assembly plate, a housing with an intermediate cover, an outer cover cap optically and haptically adapted to the steering wheel environment, and a substantially planar horn switch foil to be actuated by pressure exerted on the cover cap, a substantially planar actuating element being provided between said horn switch foil and said cover cap at a defined constant distance from the horn switch foil, and range spacers in the form of pins or webs, being provided between said actuating element and said cover cap creating an approximately constant separation distance between said actuating element and said cover cap at least across an actuating area of said cover cap.

2. Airbag module according to claim 1, where said actuating element is made of plastic and said range spacers are formed integrally with said actuating element.

3. Airbag module according to claim 1, where said intermediate cover is made of plastic and said actuating element is formed integrally with said intermediate cover and may be brought into a final assembly position by turning it by 180°.

4. Airbag module according to claim 3, where said actuating element comprises two laminar sections which are formed as part of said intermediate cover on two opposing sides thereof, and which have outer rims that can be connected to each other after folding them by 180°.

5. Airbag module according to claim 4, where said outer rims overlap each other in a final assembly condition.

6. Airbag module according to claim 5, where said outer rims each have mutual engagement means permitting said rims to be interconnected in a mutually overlapping relationship.

7. Airbag module according to claim 6, where said mutual engagement means comprise a plurality of insertion slots and a corresponding plurality of insertion tabs.

8. Airbag module according to claim 2, where said housing is made of plastic and said intermediate cover is formed integrally with said housing.

9. Airbag module according to claim 8, where said housing has a back panel with an opening to accommodate said gas generator, and where said intermediate cover is provided with a safety breaking line.

10. Airbag module according to claim 1, where said horn switch foil is so arranged as to extend over said intermediate cover and to be attached at a rim thereof to said intermediate cover and to the housing said.

11. Airbag module according to claim 1, where said cover cap has a safety breaking line and is connected with a rim thereof to said housing and said assembly plate.

12. Airbag module according to claim 1, where said assembly plate is formed in the steering wheel holding the gas generator and ensuring attachment of the airbag module.

13. Airbag module according to claim 1, where said intermediate cover, said horn foil and said actuating element extend essentially all over the internal surface of said cover cap.

14. Airbag module according to claim 1, where said actuating element has a surface area facing said horn foil (7) in a final assembly condition and provided with a plurality of actuating knubs equidistantly spaced from each other.

* * * * *